United States Patent [19]
Warner

[11] Patent Number: 4,688,807
[45] Date of Patent: Aug. 25, 1987

[54] SHAFT SEAL
[75] Inventor: Dale J. Warner, Clearwater, Fla.
[73] Assignee: Gits Bros. Mfg. Co., Tampa, Fla.
[21] Appl. No.: 776,810
[22] Filed: Sep. 17, 1985
[51] Int. Cl.$^4$ .............................................. F16J 15/34
[52] U.S. Cl. ............................. 277/93 SD; 277/81 R; 277/93 R
[58] Field of Search .................. 277/81 R, 82, 85, 86, 277/87, 91, 93 R, 93 SD, 35, 47, 48, 49, 50, 51, 52, 28, 29, 40, 41, 65, 81

[56] References Cited

U.S. PATENT DOCUMENTS

| | | | |
|---|---|---|---|
| 3,433,489 | 3/1969 | Wiese | 277/91 X |
| 3,527,511 | 9/1970 | Whittle | 277/93 X |
| 3,889,960 | 6/1975 | Wiese | 277/81 R |
| 3,970,320 | 7/1976 | Wiese | 277/81 R X |
| 4,114,899 | 9/1978 | Kulzer | 277/85 X |
| 4,183,540 | 1/1980 | Hytonen | 277/93 R X |
| 4,413,830 | 11/1983 | Pietsch | 277/65 X |
| 4,434,986 | 3/1984 | Warner | 277/65 X |
| 4,434,988 | 3/1984 | Warner | 277/93 R X |
| 4,538,820 | 9/1985 | Duffee | 277/81 R X |
| 4,538,821 | 9/1985 | Wallace | 277/81 R |

FOREIGN PATENT DOCUMENTS

| | | | |
|---|---|---|---|
| 686488 | 5/1964 | Canada | 277/91 |
| 2030133 | 12/1971 | Fed. Rep. of Germany | 277/65 |
| 935128 | 8/1963 | United Kingdom | 277/91 |

Primary Examiner—Allan N. Shoap

[57] ABSTRACT

A shaft seal comprises a rotatable seal ring carrying an annular seal member for rotatably engaging a seal face of a seal member. The seal ring is mounted in a seal holder and is coupled for rotation with a hollow sleeve connected to the shaft by at least one drive pin extending radially inwardly from the seal holder and received in a longitudinal peripheral groove, in the hollow sleeve, terminated by an annular groove. The drive pin and the longitudinal groove have flat sides and the annular groove provides for milling of the longitudinal groove with a cylindrical tool without leaving arcuate terminating sides on the longitudinal groove and permits positioning of the seal interface as close as possible to the drive mechanism.

6 Claims, 6 Drawing Figures

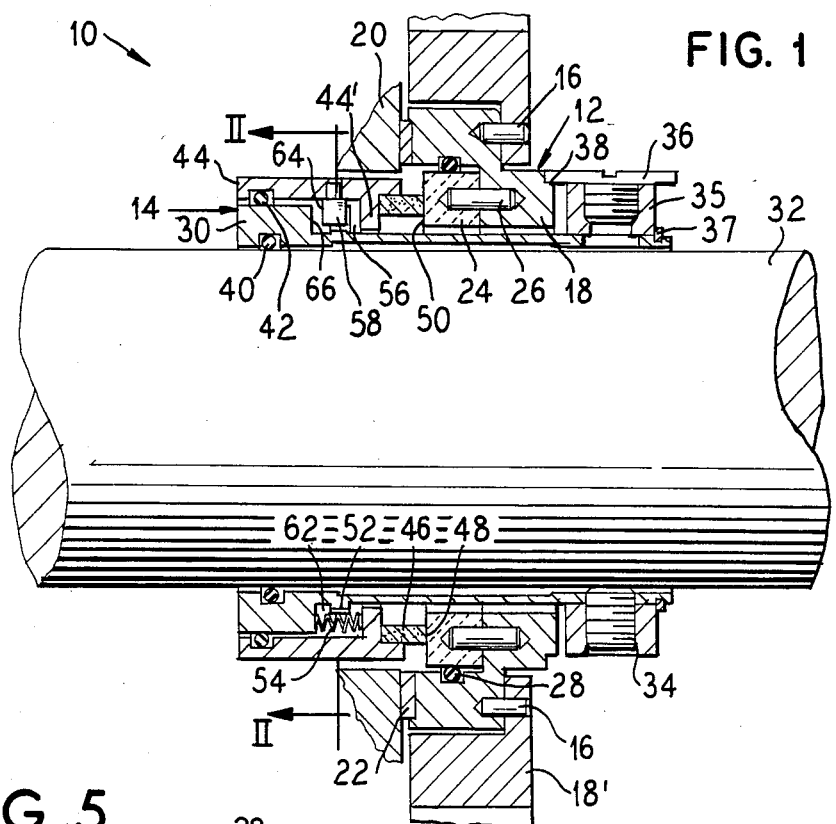
FIG. 1
FIG. 2
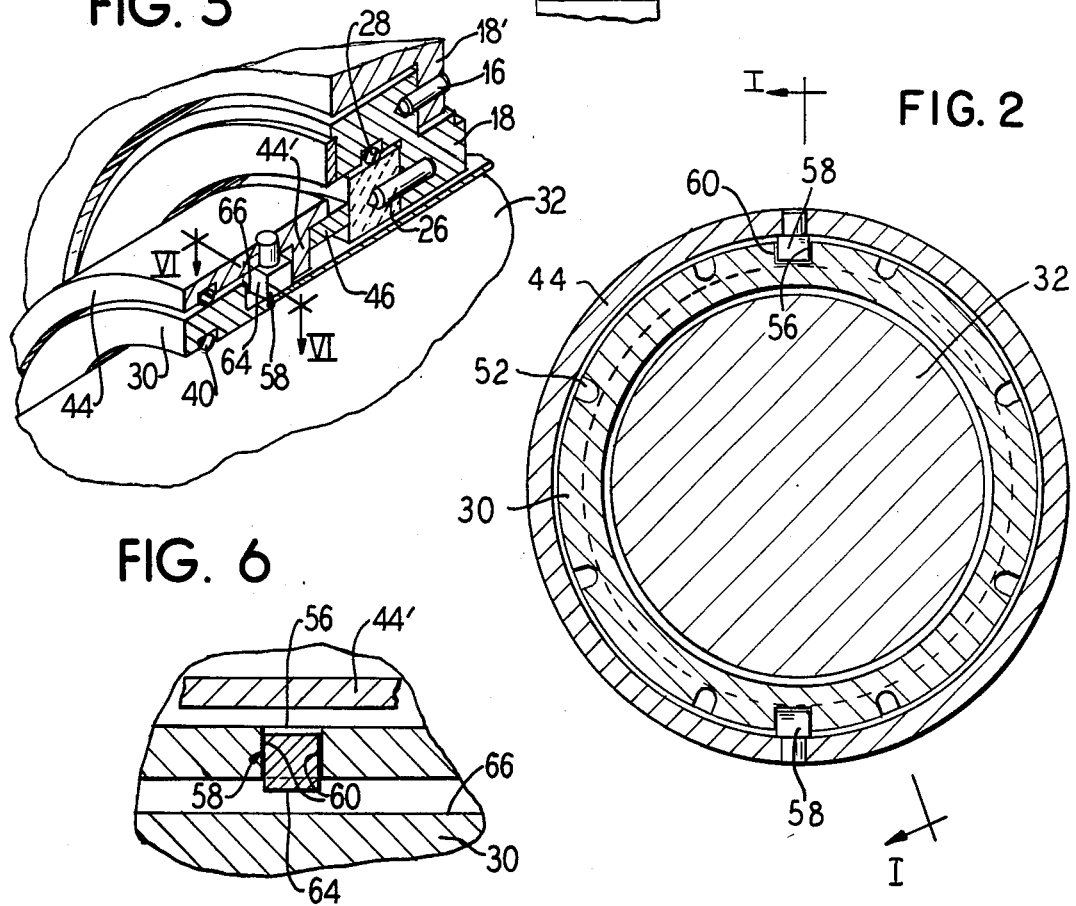
FIG. 5
FIG. 6

SHAFT SEAL

CROSS REFERENCE TO RELATED APPLICATION

This application is related to application Ser. No. 776,776, filed Sept. 17, 1985.

BACKGROUND OF THE INVENTION

1. Field of the Invention

The present invention relates to a shaft seal, and is more particularly concerned with a seal for a shaft which extends through an end wall, such as a bell housing, of a pump machine or the like.

2. Description of the Prior Art

A shaft seal is manufactured by Gits Bros. Mfg. Co., Bedford Park, Ill. known as the Type 880, in which a drive sleeve is connected to a shaft and is coupled to rotate a seal holder whose seal member has a seal face which is rotatable against an end surface of a stationary seal ring. The coupling between the drive sleeve and the seal holder comprises a plurality of lugs extending from the seal holder parallel to the axis of rotation and received in slots which are formed in the outer peripheral surface of the drive sleeve. The seal holder includes an internal annular groove which carries an O-ring which bears against the outer surface of the drive sleeve. Also, in order to maintain the sealed relationship between the seal face and the stationary ring, springs are provided in the holder to bear against the end of the drive sleeve.

Similar shaft seals are also disclosed by Dale J. Warner in U.S. Pat. No. 4,434,986 and U.S. Pat. No. 4,434,988, both issued on Mar. 6, 1984 and fully incorporated herein by this reference.

SUMMARY OF THE INVENTION

The object of the present invention is to provide the advantages of a cartridge mount shaft seal and the economic advantages of a seal which may be mounted to the end of a pump housing.

As explained in the referenced application, with conventional cartridge mount seals, one is faced with large involved flange castings or machine parts which may be bolted against the end of the pump. If one considers a typical Type 880 shaft seal, a stationary assembly has a gasket which is mounted on the end of the pump housing. There is normally a plate and there are commercial plates available with the provision for bolts or clamps that mount the stationary assembly against the end of the pump housing. This, of course, is the most economical seal to manufacture. When the seal is placed on a shaft and the stationary assembly is mounted in a Type 880 seal, for example, an annular plate is employed for mounting. The expensive part of conventional seals is the use of flanges which are an integral part of the seal. The cost of the flange and the cost of the housing compared to the simple construction discussed hereinbelow is of significance. The seal constructed in accordance with the present invention may be installed into a pump and tightened down against the housing using a conventional plate to clamp the seal to the end of a pump.

In other words, one of the major objections to cartridge mount seals is that they are quite expensive. This is because of the cost of the flange, as mentioned above, in the integral housing in that they are long and require a large amount of material to make the sleeve to mount a cartridge seal. The advantage of a cartridge mount seal is that one is not required to pull the impeller for maintenance. When the seal is mounted inside a stuffing housing, one must pull the shaft, mark the shaft from the end of the housing, screw down the seal with set screws, reassemble the impeller housing at one end of the pump and then mount the stationary assembly, pull it up and reattach the motor and the bearing housing. This requires several manhours to replace the seal. However, the cartridge mount seal requires only the removal of the bearing housing and the slipping of the seal along the shaft. In reassembly, the seal is located by centering devices and is simply bolted up against the end of the pump housing.

As mentioned above, there are many advantages in a cartridge mount seal. The disadvantages relate to the costs. As mentioned above, the integral flange is of major concern.

In accordance with the present invention the advantages of a cartridge mount seal have been attained at the cost advantages of a conventional stuffing box seal. The approach taken was to design the outer housing of the seal in such a manner that the seal can be mounted with commercially available reuseable plate flanges. If the seal is discarded it is only necessary to discard a smaller portion of the total assembly. Another feature is to reduce the cost of the seal and to facilitate installation within various pump configurations by reducing the overall length of the seal.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a longitudinal sectional view taken substantially along the line I—I of FIG. 2, of a first embodiment of a shaft seal constructed in accordance with the present invention;

FIG. 2 is a transverse section, taken substantially along the line II—II of FIG. 1;

FIG. 5 is a sectional perspective view of the shaft seal illustrated in FIG. 1; and FIG. 6 is a sectional view taken substantially aling the line VI—VI of FIG. 5.

DESCRIPTION OF THE PREFERRED EMBODIMENTS

Figure 3:
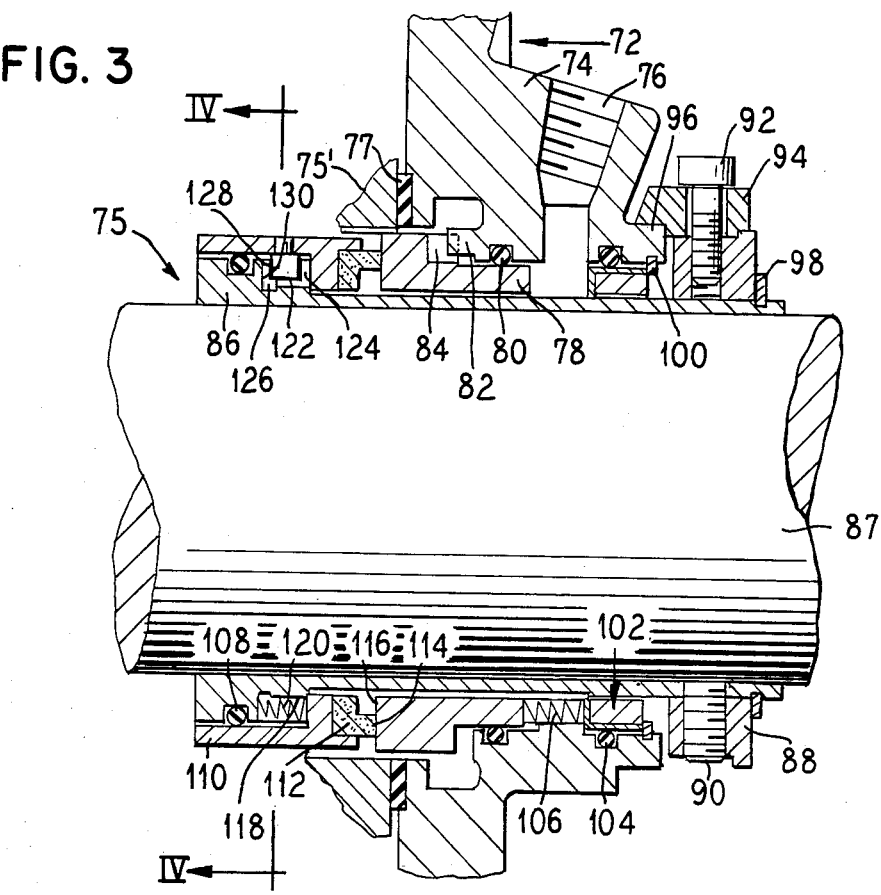
FIG. 3 is a longitudinal sectional view taken substantially along the line III—III of FIG. 4, showing another embodiment of a shaft seal constructed in accordance with the present invention.

Referring to FIGS. 1, 2 and 5 a shaft seal is generally illustrated at 10 as comprising a fixed or stationary assembly 12 and a rotatable assembly 14.

The stationary assembly 12 comprises a plurality of pins 16 securing a stationary holder 18 to a housing or mounting plate 18' which, in turn, is bolted to a machine housing 20 with a gasket 22 therebetween. The holder 18 is connected to a ring 24, for example a ceramic ring, by way of a plurality of pins 26 and is sealed with respect to the holder by way of an O-ring 28.

The rotary assembly 14 comprises a sleeve 30 which extends the length of the seal and receives the shaft 32 therethrough. The sleeve 30 is provided with a plurality of set screws 34 (for example three set screws, only one illustrated) for securing the sleeve 30 to the shaft 32.

The set screw 34 extends through a lock ring 35 located by way of a snap ring 37 in a peripheral groove of the sleeve 30. In order to maintain alignment of the parts, for example during shipping, a plurality of centering screws 36 (for example three centering screws) may be provided and screwed into the lock ring 35 so that the heads of the screws engage a peripheral recess 38 in the stationary holder 18.

The sleeve 30 is sealed to the shaft 32 by way of an O-ring 40. Likewise, an O-ring 42 seals the sleeve 30 to a rotary holder 44 which mounts a rotary seal 46 against a flange 44', for example a carbon ring having a lapped surface 48 for engaging a sealing surface 50 of the ring 24.

As best seen in the lower portion of FIG. 1 and in FIG. 2, the sleeve 30 comprises an elongated tubular section carrying a larger diameter peripheral collar including a plurality of circumferentially spaced, axially extending recesses 52 for receiving respective springs 54 which, in turn, urge the seal holder 44 and the seal 46 towards the stationary assembly so that the surfaces 48 and 50 are in flat intimate rotational contact.

As is readily apparent, the sleeve 30 constitutes a drive sleeve and comprises a pair of axially extending grooves 56 having a pair of flat planar walls (see FIGS. 2 and 6) for receiving therebetween corresponding flat parallel surfaces of a respective drive pin 58 which is secured to and extends radially from the seal holder 44. In order for the drive pin 58 to move axially in the groove 56 and, at its rearwardmost travel, not engage and dig into rounded surfaces normally caused by the milling of such a groove, and in order to prevent wear of the groove and the drive pin which would be caused by such structure, the groove is terminated with a flat surface by the provision of a circumferential groove 62 which intersects the grooves 56. Therefore, the drive pins 58 may move to the left in FIG. 1 and into flat engagement of its flat surface 64 with the flat surface 66 of the groove 62.

Figure 4:
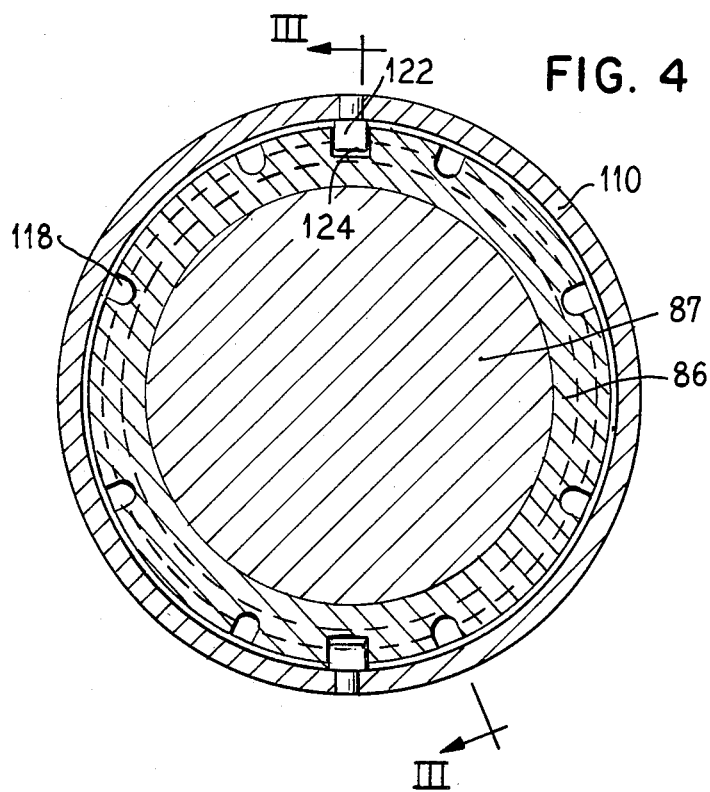
FIG. 4 is a transverse sectional view taken substantially along the line IV—IV of FIG. 3.

Referring to FIGS. 3 and 4, another shaft seal 70 is illustrated as comprising a gland assembly 72 as a part of the stationary assembly. The gland assembly 72 comprises a gland 74 including a pair of ports 76 (only one shown) for supporting a flow of coolant through the seal. The gland 74 is sealed to a ring 78, for example a ceramic ring, by way of an O-ring 80 and fixes the ring 78 against rotation by way of a plurality of projections 82 which extend into grooves 84 in the ring 78. The gland 74 is connected to the housing 75' by way of bolts, as in the case of the apparatus of FIGS. 1 and 2.

As before, the seal is mounted to a machine housing 75 and is provided with an intervening gasket 77.

A rotating assembly 75 comprises a sleeve 86 for receiving a shaft 87 therethrough. As shown at the right side of FIG. 3, the sleeve 86 carries a lock ring 88 which is located by way of a snap ring 98 in a groove of the sleeve 86. The lock ring 88 is provided with a plurality of set screws 90 (for example three set screws) for securing the sleeve 86 to the shaft 87. As with the previous embodiment, for the purpose of centering and maintaining the elements aligned during shipping and the like, the lock ring 98 is also provided with a plurality of cap screws 92 (three cap screws) and centering clips 94 to be tightened against a surface 96 of the gland 74. A seal is provided for the coolant by way of a throttle assembly 102, including a throttle bushing and throttle holder, which is located by a snap ring 100 in a groove of the gland 72 and which is sealed to the gland by way of an O-ring 104.

As shown in the lower portion of FIG. 1, a plurality of springs 106 urge the ring 78 away from the throttle assembly and towards the rotating assembly.

A seal holder 110 is sealed to the sleeve 86 by way of an O-ring 108 and holds a seal ring 112, for example a carbon ring, against the ceramic ring 78 with a surface 114 of the carbon ring 112 flat against the surface 116 of the ceramic ring 78.

As best seen in the lower part of FIG. 3 and in FIG. 4, the sleeve 86 comprises a plurality of circumferentially-spaced grooves 118 each having a respective spring 120 therein which urges the seal holder 110 and, thus, the seal ring 112 toward the ceramic ring 78.

As with the previously-discussed embodiment, the sleeve 86 constitutes a drive sleeve and includes a plurality of axially extending grooves 124 having parallel axially-extending walls for receiving therebetween a pair of similar flat axially-extending walls of a drive pin 122 which is mounted to the seal holder 110. In this particular embodiment, two such pin and groove combinations are provided.

Also as with the previous embodiment, the rear surface 128 of each drive lug 122 may flatly engage a corresponding flat surface 130 of a peripheral groove 126 which intersects the grooves 124.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a shaft seal of the type in which a first seal assembly is adapted for connection to and mutual rotation with a shaft of a machine and carries a first seal ring comprising a first annular seal surface, and in which a ring-shaped second seal assembly comprises a second seal ring including a second annular seal surface for engaging the first annular seal surface and is adapted for mounting about the shaft and fixed to the housing of the machine, and in which the first seal assembly comprises a plurality of rotationally interconnected rings, including a seal ring holder carrying the first seal ring, and a sleeve for sealingly receiving the shaft therethrough, the improvement wherein:

at least one of said plurality of rotationally interconnected rings comprises an axially extending groove including a pair of opposed parallel flat surfaces;

a radially extending drive pin is mounted to another of said plurality of rings and comprises a pair of parallel opposite flat surfaces between and parallel to the opposed flat surfaces, and a further surface perpendicular to the parallel opposite flat surfaces; and the at least one ring comprises an annular groove intersecting the axially extending groove and including an additional surface parallel to and for engaging the further flat surface of the drive pin.

2. In a shaft seal of the type in which a first seal assembly is adapted for connection to and mutual rotation with a shaft of a machine and carries a first seal ring comprising a first annular seal surface, and in which a ring-shaped second seal assembly comprises a second seal ring including a second annular seal surface engaging the first annular seal surface and adapted for mounting about the shaft and fixed to the housing of the machine, and in which the first seal assembly comprises a sleeve for sealingly receiving the shaft therethrough, a seal ring holder carrying the first seal ring and sealingly disposed about the shaft, a plurality of openings circumferentially located in the sleeve and a plurality of springs in respective openings bearing against and urging the sleeve and the holder apart axially, at least one axially extending groove in the sleeve, and at least one drive pin mounted in the seal holder and extending into the groove to rotationally couple the sleeve and the seal holder, the improvement wherein:

the sleeve comprises an outer peripheral surface, the at least one groove extending along the outer peripheral surface and comprising opposed flat surfaces;

the at least one radially extending drive pin comprises a pair of opposite parallel flat surfaces parallel to and located between the opposed flat surfaces, and a further flat surface perpendicular to the opposite parallel surfaces; and the sleeve includes an annular groove intersecting and terminating the at least one groove and includes an additional surface parallel to and for engaging the further flat surface of the drive pin.

3. In a shaft seal of the type in which a first seal assembly is adapted for connection to and mutual rotation with a shaft of a machine and carries a first seal therein comprising a first annular seal surface, and in which a ring-shaped second seal assembly comprises a second seal ring including a second annular seal surface engaging the first annular seal surface and is adapted for mounting about the shaft and fixed to the housing of the machine, and in which the first seal assembly comprises a sleeve sealingly receiving the shaft therethrough, a seal ring holder carrying the first seal ring and sealingly disposed about the sleeve, and a sleeve collar disposed about and connected to the sleeve, the collar comprising a plurality of openings therethrough and a plurality of springs in respective openings engaging and urging apart the sleeve and the seal ring holder, at least one axial extending groove in the collar and at least one drive pin mounted in said seal holder and extending into the at least one groove for rotationally coupling the sleeve to the seal holder via the collar, the improvement wherein:

the at least one axially extending further groove includes a pair of opposed flat surfaces;

the at least one radially extending drive pin comprises a pair of opposite parallel flat surfaces between and parallel to the opposed flat surfaces, and a further flat surface perpendicular to the opposite parallel surfaces; and the collar includes an annular groove intersecting and terminating the at least one groove and includes an additional surface parallel to and for engaging the further flat surface of the drive pin.

4. A shaft seal for a rotatable shaft which extends through a machine housing, said shaft seal comprising:

a hollow sleeve for sealingly receiving the shaft therethrough and including mounting means for securing said sleeve to the shaft;

a fixed assembly for sealed securement to the machine housing, including a stationary seal ring about the shaft comprising an annular first seal surface; and a rotary assembly sealingly mounted on said hollow sleeve, including a rotary seal ring about the shaft comprising an annular second seal surface sealingly engaging said first seal surface, a holder about the shaft mounting said rotary seal ring, said holder including an annular radially extending flange, a surface of said sleeve facing said fixed assembly, a plurality of openings extending into said sleeve from said surface and a plurality of springs in respective ones of said openings bearing against and urging apart said sleeve and said annular radially extending flange, a plurality of axially extending grooves in said sleeve each including a pair of opposed flat surfaces, an annular groove in said sleeve intersecting said plurality of grooves and including an annular flat surface facing said fixed assembly, and a plurality of drive pins extending from said holder into respective ones of said axially extending grooves and each including a pair of opposite parallel flat surfaces parallel to said opposed flat surfaces and a further flat surface parallel to said annular flat surface of said annular groove.

5. The shaft seal of claim 4, wherein the machine housing includes an opening receiving said fixed assembly, and wherein:

at least on one side of the machine housing, said fixed assembly comprises a diameter less than the smallest dimension of the opening for axial removal.

6. The shaft seal of claim 4, wherein:

said plurality of drive pins extend radially from said holder into respective ones of said axially extending grooves.

* * * * *